United States Patent
Schipper

(10) Patent No.: US 8,099,251 B2
(45) Date of Patent: Jan. 17, 2012

(54) SYSTEMS AND METHODS FOR CERTIFYING A RACKED COMPUTER ASSEMBLY

(75) Inventor: Stephen Schipper, Austin, TX (US)

(73) Assignee: Dell Products L.P., Round Rock, TX (US)

(*) Notice: Subject to any disclaimer, the term of this patent is extended or adjusted under 35 U.S.C. 154(b) by 726 days.

(21) Appl. No.: 12/253,844

(22) Filed: Oct. 17, 2008

(65) Prior Publication Data

US 2010/0100858 A1 Apr. 22, 2010

(51) Int. Cl.
*G01D 3/00* (2006.01)
(52) U.S. Cl. .................................................. 702/108
(58) Field of Classification Search .................. 702/108
See application file for complete search history.

(56) References Cited

U.S. PATENT DOCUMENTS 7,165,189 B1  1/2007 Lakkapragada et al. ......... 714/31
7,426,052 B2 * 9/2008 Cox et al. ...................... 358/1.15

* cited by examiner

*Primary Examiner* — Aditya Bhat
(74) *Attorney, Agent, or Firm* — Baker Botts L.L.P.

(57) ABSTRACT

In some embodiments, a method for testing a chassis including one or more information handling systems is provided. The method includes receiving a chassis configuration specification that defines a set of required components for a chassis configuration, generating one or more test images based at least the received chassis configuration specification, automatically determining components of the chassis, testing the determined components of the chassis using the one or more generated test images, and reporting results from the testing to a user.

20 Claims, 2 Drawing Sheets

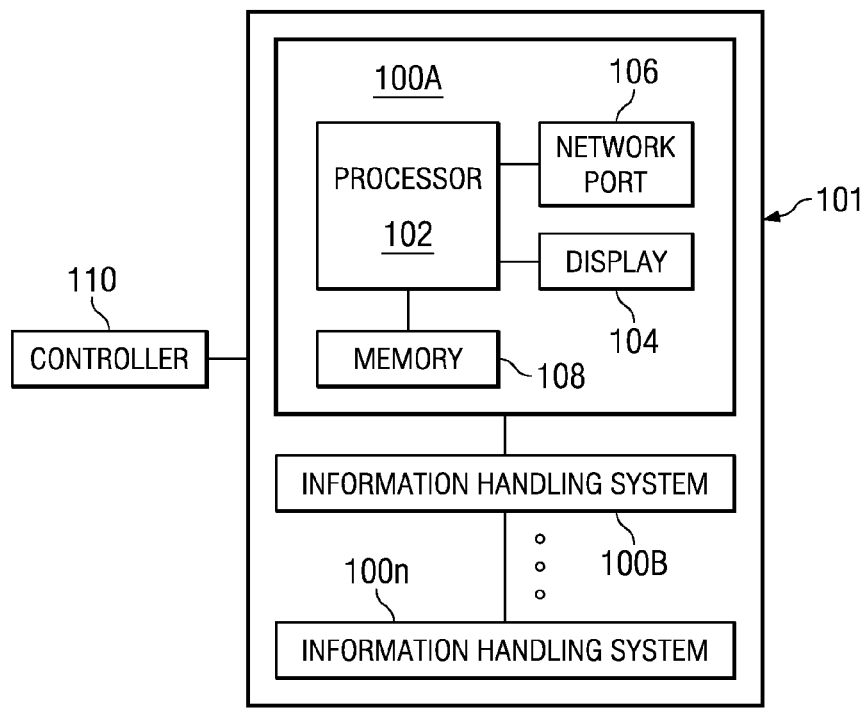
Figure 1
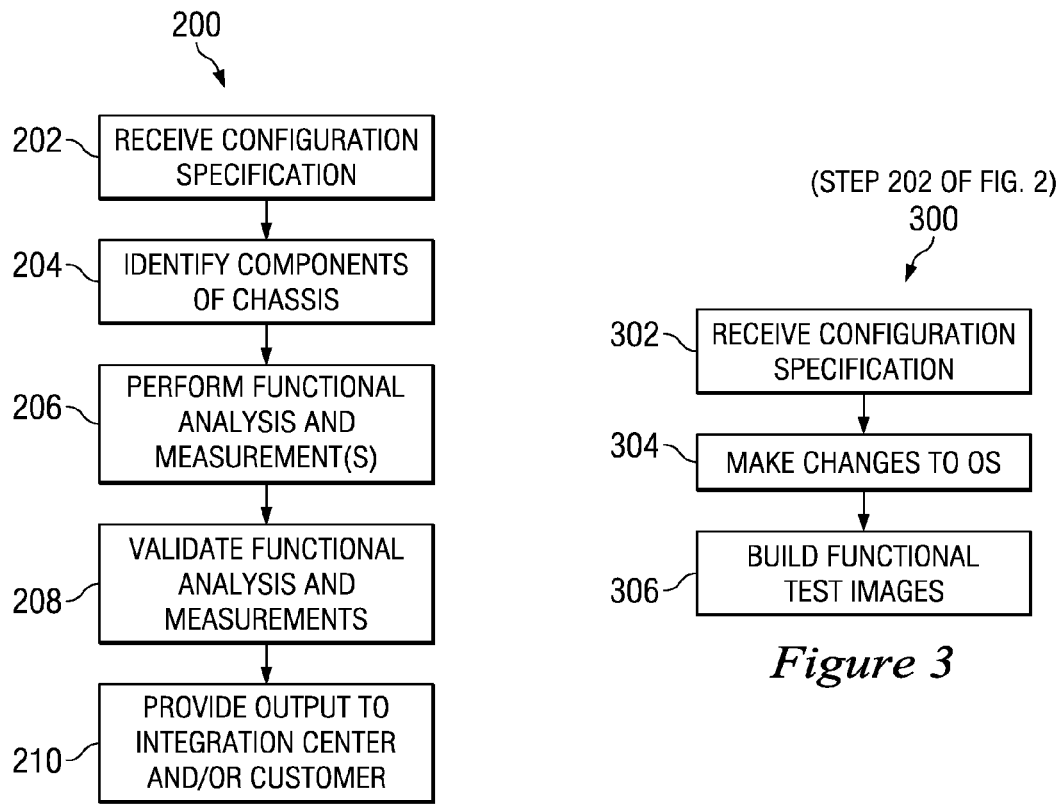
Figure 2
Figure 3

SYSTEMS AND METHODS FOR CERTIFYING A RACKED COMPUTER ASSEMBLY

TECHNICAL FIELD

The present disclosure relates to information handling systems, and more particularly, systems and methods for certifying a racked computer assembly.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as, but not limited to, financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems are often configured in a chassis that includes various components such as, for example, one or more servers, storage, and/or network device(s) often specified and unique to a customer's need. While each of the components may be individually tested at the time of manufacturing, there is currently no effective uniform method for testing the assembly of all the components as a single chassis unit. Issues such as network continuity, power system continuity, performance measurement (e.g., benchmark tests), verification, and/or other measurement processes of the entire chassis are often overlooked.

SUMMARY

In accordance with certain embodiments of the present disclosure. A method for testing a chassis including one or more information handling systems is provided. The method includes receiving a chassis configuration specification that defines a set of required components for a chassis configuration, generating one or more test images based at least the received chassis configuration specification, automatically determining components of the chassis, testing the determined components of the chassis using the one or more generated test images, and reporting results from the testing to a user.

In accordance with certain embodiments, a controller for a chassis including one or more information handling systems is provided. The controller may be configured to receive a chassis configuration specification that defines a set of required components for a chassis configuration, generate one or more test images based at least the received chassis configuration specification, automatically determine components of the chassis, test the determined components of the chassis using the one or more generated test images, and report results from the testing to a user.

In certain embodiments, a system may include a chassis including one or more information handling systems, and a controller associated with the chassis. The controller may be configured to: receive a chassis configuration specification that defines a set of required components for a chassis configuration, generate one or more test images based at least the received chassis configuration specification, automatically determine components of the chassis, test the determined components of the chassis using the one or more generated test images, and report results from the testing to a user.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIG. 1 illustrates a block diagram of a chassis including multiple information handling systems and a controller configured to certify the components and functionality of the chassis, in accordance with certain embodiment of the present disclosure;

FIG. 2 illustrates a flow chart of an example method for certifying the components and functionality of the chassis depicted in FIG. 1, in accordance with certain embodiments of the present disclosure;

FIG. 3 illustrates a flow chart of an example method for receiving a chassis configuration specification, in accordance with certain embodiments of the present disclosure;

DETAILED DESCRIPTION

Figure 4:
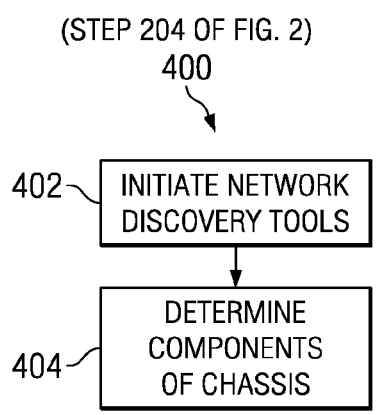
FIG. 4 illustrates a flow chart of an example method for determining the components of a chassis, in accordance with certain embodiments of the present disclosure.

Preferred embodiments and their advantages are best understood by reference to FIGS. 1 through 6, wherein like numbers are used to indicate like and corresponding parts.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and/or a video display. The information handling system may also include one or more buses operable to transmit communications between the various hardware components.

FIG. 1 illustrates a block diagram of multiple information handling systems 100 (100A, 100B, ... 100n) assembled in a chassis 101 and a controller 110 configured to certify the components and/or determine the functionality of chassis 101, in accordance with certain embodiment of the present disclosure. Chassis 101 may be an enclosure or framework that serves as a housing or container for various information handling systems 100, and may be constructed from steel, aluminum, plastic, and/or any other suitable material. Although the term "chassis" is used, chassis 101 may also be referred to as a case, cabinet, tower, box, enclosure, and/or housing. In addition, at various instances in this disclosure, the term "chassis" refers to the contents of the chassis (e.g., information handling systems 100 and/or other components), as would be understood by one of ordinary skill in the art.

As depicted in FIG. 1, chassis 101 may house multiple information handling systems 100. In certain embodiments, information handling systems 100 may be configured in a "rack and stack" assembly that includes one or more information handling systems 100 and/or other components that are stacked in a framework, such as chassis 101, although other assemblies may also be used.

As shown in FIG. 1, each information handling system 100 may include a processor 102, a display 104, a network port 106, memory 108, and/or any other suitable components of an information handling system.

Processor 102 may comprise any system, device, or apparatus operable to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 102 may interpret and/or execute program instructions and/or process data stored in memory 108 and/or another component of information handling system 100 and may output results, graphical user interfaces (GUIs), websites, and the like via display 104 or over network port 106.

Display 104 may comprise any display device suitable for creating graphic images and/or alphanumeric characters recognizable to a user, and may include, for example, a liquid crystal display (LCD) or a cathode ray tube (CRT).

Network port 106 may be any suitable system, apparatus, or device operable to serve as an interface between information handling system 100 and a network. Network port 106 may enable information handling system 100 to communicate over a network using any suitable transmission protocol and/or standard, including without limitation all transmission protocols and/or standards known in the art.

Memory 108 may be coupled to processor 102 and may comprise any system, device, or apparatus operable to retain program instructions or data for a period of time. Memory 104 may comprise random access memory (RAM), electrically erasable programmable read-only memory (EEPROM), a PCMCIA card, flash memory, or any suitable selection and/or array of volatile or non-volatile memory that retains data after power to information handling system 100 is turned off.

Although FIG. 1 depicts memory 108 as a component of information handling system 100A, one or more memories 108 may reside external to information handling system 100A, and may be communicatively coupled to one or more additional information handling systems 100 (e.g., information handling systems 100B and/or 100C). Similarly, information handling systems 100 may share other resources such as power supplies, display 104, network devices (e.g., network 106), I/O ports, and other components, devices, or ports with other components of chassis 101.

Controller 110 may be coupled to chassis 101 and may be embodied in hardware (e.g., system, device, or apparatus), software, firmware, or any combination thereof, and may be configured to determine, for example, the components of chassis 101 and/or the cohesive functionality of chassis 101 (e.g., the functionality of all the information handling systems 100 and/or other components of chassis 101).

In some embodiments, controller 110 may include software, firmware, or other logic embodied in computer-readable media for providing various functionality of controller 110 discussed herein. As used in this disclosure, "tangible computer readable media" that may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory, as well as communications media such wires, optical fibers, microwaves, radio waves, and other electromagnetic and/or optical carriers, and/or any combination of the foregoing.

In operation, controller 110 may be configured to identify, for example, the components of chassis 101, perform functional tests and/or chassis configuration of some or all of the identified components, and validate the functional tests performed. The communicative interactions between controller 110 and the components of chassis 101, including information handling systems 100 is described below in more detail with respect to FIG. 2.

FIG. 2 illustrates a flow chart of an example method 200 for certifying the components and functionality of chassis 101 depicted in FIG. 1, in accordance with certain embodiments of the present disclosure. At step 202, controller 110 may receive as input a chassis configuration specification for a chassis to be assembled/configured, and generate (or build) one or more test images for testing the assembled configured chassis. The test image may be one or more functionally tests used to determine if a component of chassis 101 is, for example, operating, as specified by the customer, etc. The chassis configuration specification, as define and used herein, refers to a "barfile" that describes the components of chassis 101, as specified by a customer. For example, the chassis configuration specification may include the number of information handling systems 100 ordered, the number of other components in chassis 101 (e.g., switches, power supplies, etc.), passwords for each component as specified by the customer, and/or a list of functional tests to run on components of chassis 101 (e.g., benchmark required by the customer). Details of step 202 are described in more detail with respect to FIG. 3.

At step 204, controller 110 may automatically determine the components of chassis 101. In one embodiment, controller 110 may use a network discovery tool, such as a dynamic host control protocol (DHCP) to determine, for example, a media access control (MAC) address or other unique identifiers to determine the components of chassis 101. Details of step 204 are described in more detail with respect to FIG. 4.

At step 206, using the obtained unique identifiers found at step 204, controller 110 may access each identified component and may perform the functional tests as outlined in the chassis configuration specification received at step 202. In one embodiment, the functional tests may include standard tests including for example, verifying the components are functional (e.g., hard drive are spinning up), that the system is built as specified by the chassis configuration specification (e.g., the correct amount of RAM, the correct amount of servers, switches, power supplies, etc.). In the same or alternative embodiments, controller 110 may perform customer-specified tests as defined in the chassis configuration specification received at step 202. For example, controller 110 may determine if customer defined fields (e.g., server names, passwords, etc.) are correct. Details of step 206 are described in more detail with respect to FIG. 5.

At step 208, controller 110 may validate the functional tests performed at step 206. In one embodiment, controller 110 may read the output of each functional test. If any one of the test(s) have failed, controller 110 may provide the information to an integration center configured to build chassis 101 for correction (e.g., replacement of failed drives, update customer's defined fields, etc.).

At step 210, the controller 110 may generate a complete performance and functional "blueprint" of chassis 101 and may provide the blueprint to a customer of chassis 101. In one embodiment, the blueprint may be stored on chassis 101 (e.g., memory 108) and may subsequently be read by the customer after chassis 101 is shipped. Details of steps 208 and 210 are described in more detail with respect to FIG. 6

FIG. 3 illustrates a flow chart of an example method 300 for receiving a chassis configuration specification (e.g., step 202 of FIG. 2), in accordance with certain embodiments of the present disclosure. At step 302, controller 110 may receive a chassis configuration specification. A user, via an input device coupled to controller 110 (e.g., microphone, keyboard, mouse), may input the chassis configuration specification that indicates the intended configuration of chassis 101. For example, a customer may configure (e.g., via an online interface or otherwise) a unique chassis 101 with certain components, performance level, memory, power criteria, etc. An integration center, configured to assemble the chassis 101 per the customer's request, may input to controller 110 all the intended criteria to ensure that chassis 101 is built and functions as the customer requested.

In one embodiment, the chassis configuration specification may include, for example, the basic chassis configuration (e.g., the number of different components such as the number of information handling system 100, number of network switches), the intended operating system, standard, and customer specified tests, etc.

At optional step 304, controller 110 may read the chassis configuration specification received at step 302, and make any necessary changes to the testing environment and/or chassis 101 to conform to the chassis configuration specification. For example, if the customer has defined a specific operating system (OS) chassis 101 will be operating under, controller 110 may load the specific OS requested to ensure that the tests performed (e.g., step 206 of FIG. 2) coincide with how chassis 101 would operate.

At step 306, controller 110 may build one or more test images (e.g., a set of executable instructions to determine the functionality, operation, specification, and other factors of a component of chassis 101) based at least on the received the chassis configuration specification, store the test images in a memory associated with the controller, and execute the test images.

FIG. 4 illustrates a flow chart of an example method 400 for determining the components of chassis 101 (e.g., step 204 of FIG. 2), in accordance with certain embodiments of the present disclosure. At step 402, controller 110 may initiate one or more network discovery tools including, for example, preboot execution (PXE), DHCP, and/or file transfer protocol (FTP), each tool configured to determine unique identifiers of each component of chassis 101.

At step 404, using one or more of the network discovery tools, controller 110 may determine some or all of the components of chassis 101. In one embodiment, controller 110 may use a DHCP server that collects MAC addresses or other unique identifiers for all DHCP configurable interfaces, including, for example, BMC LAN, system network LAN, switch WAN, and/or other DHCP supported device that is communication with chassis 101.

Figure 5:
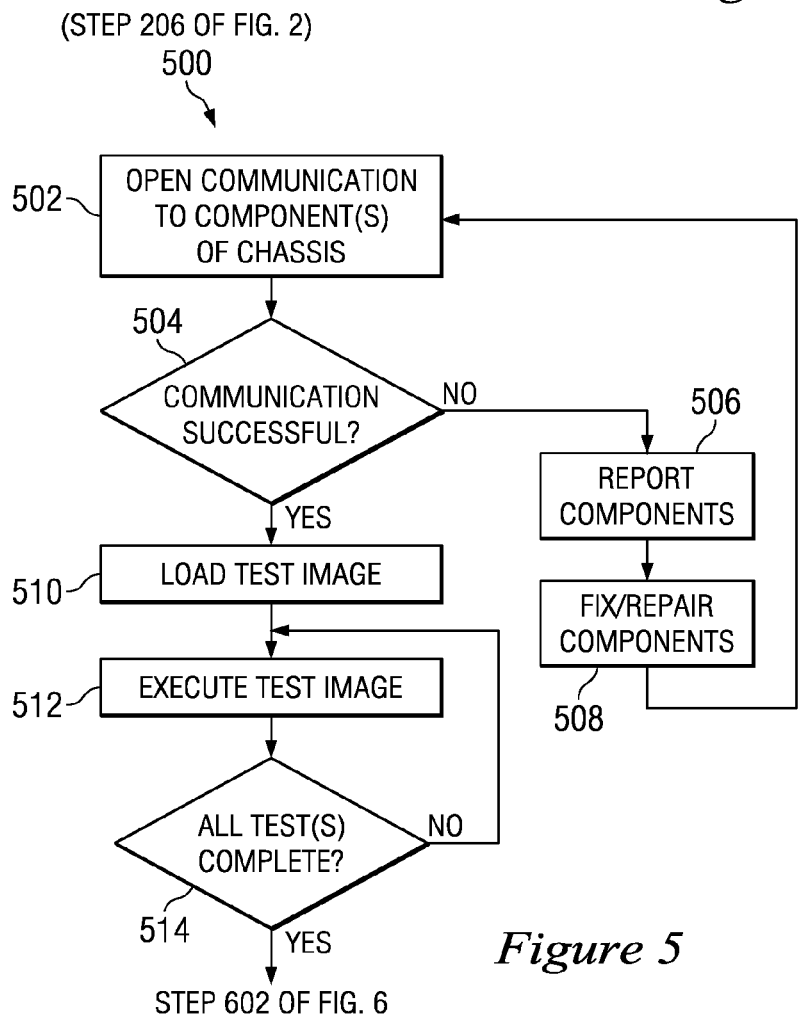
FIG. 5 illustrates a flow chart of an example method for testing the components of a chassis, in accordance with certain embodiments of the present disclosure.

FIG. 5 illustrates a flow chart of an example method 500 for testing the components of chassis 101 (e.g., step 206 of FIG. 2), in accordance with certain embodiments of the present disclosure. At step 502, using the MAC address or other unique identifiers (e.g., identified in step 404 of FIG. 4), controller 110 may attempt to initiate a communication with the components that need to be tested (e.g., information handling systems 100).

At step 504, controller 110 may determine if a communication channel has been established with each component to be tested. If a channel has not been established, the method may proceed to step 506. Otherwise, if communication channels have been successfully established, the method may proceed to step 510.

At step 506, controller 110 may report the component that has failed to establish a communication channel, for example, to the integration center configured to assemble the components of chassis 101. In one embodiment, the controller 110 may provide, as output via a display (e.g., display 104), a report of all the components including the status of the communication channels between controller 110 and each component. At step 508, the one or more components may be fixed and/or replaced as appropriate, and the method may proceed to step 504.

At step 510, controller 110 may load one or more test images (e.g., from step 306 of FIG. 3), using for example, an FTP protocol. In one embodiment, controller 110 may load test image(s) stored in a memory device (e.g., memory 108) and may boot an OS (e.g., as defined by the chassis configuration specification) to execute the test image(s).

At step 512, controller 110 may execute the associated test image(s) for each component. In one embodiment, controller 110 may perform one or more functional tests (e.g., standard test(s) and/or customer specified test(s)) for each component.

At step 514, controller 110 may determine that all the test images have been executed for the respective devices. If all the tests have been complete, the method may proceed to step 602 of FIG. 6, described in more detail below. Otherwise, if there are more test images to be executed, the method may proceed to back to step 512.

Figure 6:
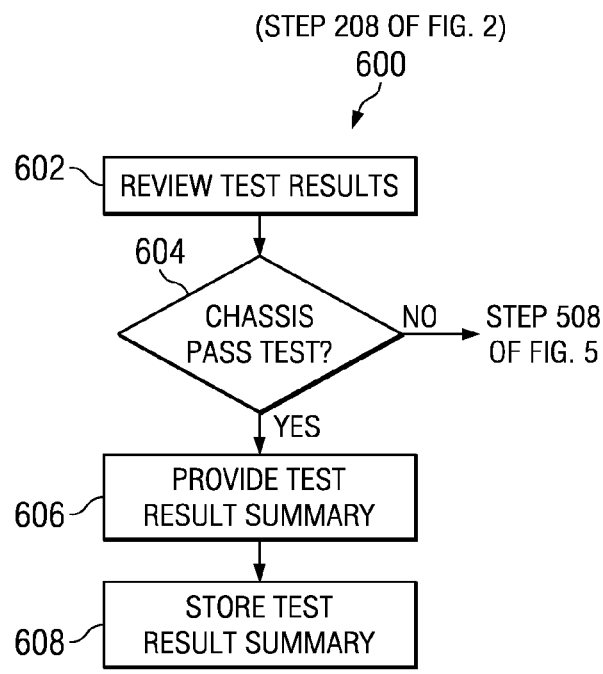
FIG. 6 illustrates a flow chart of an example method for validating and providing the test results to an integration center and/or a customer, in accordance with certain embodiments of the present disclosure.

FIG. 6 illustrates a flow chart of an example method 600 for validating and providing the test results to an integration center and/or a customer, in accordance with certain embodiments of the present disclosure. At step 602, controller 110 may review the results from the executed tests (e.g., step 514 of FIG. 5).

At step 604, controller 110 may determine if chassis 101 passes the tests (e.g., meets customer's specification). If test results indicate that one or more components have failed, controller 110 may provide information to the integration center to have the failed component(s) fixed and/or replaced (e.g., step 508 of FIG. 5). Otherwise, if chassis 101 has passed the tests (e.g., all components are as intended and/or functional), the method may proceed to step 606.

At step 606, controller 110 may provide (e.g. via display 104) the test results to the integration center. The test results may include a blueprint (e.g., the components, the specification of each component, etc.) of chassis 101. Based at least on the test results, the integration center may finalize the assembly of chassis 101 and may prepare chassis 101 for shipping to the customer.

At step 608, controller 110 may also store the blueprint of the chassis 101 in, for example, memory 108. In one embodiment, a customer may access the blueprint and may use the information provided by the blueprint for further testing, integration with other systems the customer may have, and/or as a service tool when chassis 101 needs updating or when chassis 101 fails.

The blueprint may also allow the customer to verify the state of chassis 101. For example, after chassis 101 has been shipped and powered on by the customer, processor 102 and/or controller 110 may automatically access the stored blueprint and/or the customer may access the blueprint (e.g., via I/O devices coupled to information handling system 100) to determine whether the components of chassis 101 are currently operating as tested before shipment. Additionally, the customer may be able to determine and/or confirm whether the chassis 101 was built to order by reviewing the blueprint.

Although the present disclosure has been described in detail, it should be understood that various changes, substitutions, and alterations can be made hereto without departing from the spirit and the scope of the invention as defined by the appended claims.

What is claimed is:

1. A method for testing a chassis including one or more information handling systems, comprising:
   receiving a chassis configuration specification that defines a set of required components for a chassis configuration;
   based at least on the received chassis configuration specification, generating one or more test images;
   automatically determining components of the chassis;
   testing the determined components of the chassis using the one or more generated test images; and
   reporting results from the testing to a user.

2. The method according to claim 1, wherein the chassis configuration specification comprises at least one of:
   a number of components;
   the type of components;
   customer defined fields for each component; and
   a list of functional tests.

3. The method according to claim 2, wherein the functional tests comprise standard tests or customer specified tests.

4. The method according to claim 1, wherein automatically determining components of the chassis comprises automatically determining a unique identifier of each component.

5. The method according to claim 1, wherein reporting the test results to a user comprises reporting an error to an integration center.

6. The method according to claim 1, wherein reporting the test results to a user comprises building a blueprint of the chassis.

7. The method according to claim 6, further comprising storing the blueprint of the chassis in the chassis.

8. A controller for a chassis including one or more information handling systems, the controller configured to:
   receive a chassis configuration specification that defines a set of required components for a chassis configuration;
   based at least on the received chassis configuration specification, generate one or more test images;
   automatically determine components of the chassis;
   test the determined components of the chassis using the one or more generated test images; and
   report results from the testing to a user.

9. The controller according to claim 8, wherein the one or more information handling systems each comprise:
   a processor; and
   memory coupled to the processor.

10. The controller according to claim 8, wherein the controller is further configured to automatically establish a communication channel with the determined components of chassis.

11. The controller according to claim 10, wherein automatically determining components of the chassis comprises automatically determining a unique identification of the component.

12. The controller according to claim 11, wherein the unique identification of the component comprises a media access control (MAC) address.

13. The controller according to claim 12, wherein the controller is further configured to store the blueprint of the chassis in the chassis.

14. The controller according to claim 11, wherein reporting the test results comprises building a blueprint of the chassis.

15. A system, comprising:
   a chassis including one or more information handling systems; and
   a controller associated with the chassis and configured to:
      receive a chassis configuration specification that defines a set of required components for a chassis configuration;
      based at least on the received chassis configuration specification, generate one or more test images;
      automatically determine components of the chassis;
      test the determined components of the chassis using the one or more generated test images; and
      report results from the testing to a user.

16. The system of claim 15, wherein the controller is further configured to automatically establish a communication channel with the determined components of chassis.

17. The system according to claim 15, wherein automatically determining components of the chassis comprises automatically determining a unique identification of the component.

18. The system according to claim 15, wherein the unique identification of the component comprises a media access control (MAC) address.

19. The system according to claim 15, wherein reporting the test results comprises building a blueprint of the chassis.

20. The system according to claim 15, wherein the controller is further configured to store the blueprint of the chassis in the chassis.

* * * * *